US012677098B2

(12) United States Patent
Rao et al.

(10) Patent No.: US 12,677,098 B2
(45) Date of Patent: Jul. 7, 2026

(54) SPEAKER STRUCTURE

(71) Applicant: MERRY ELECTRONICS (SUZHOU) CO., LTD., Jiangsu Province (CN)

(72) Inventors: LiGuo Rao, Jiangsu Province (CN); ChunLong Zheng, Jiangsu Province (CN); MingYa Luo, Jiangsu Province (CN)

(73) Assignee: MERRY ELECTRONICS (SUZHOU) CO., LTD., Jiangsu Province (CN)

(*) Notice: Subject to any disclaimer, the term of this patent is extended or adjusted under 35 U.S.C. 154(b) by 154 days.

(21) Appl. No.: 18/817,765

(22) Filed: Aug. 28, 2024

(65) Prior Publication Data

US 2025/0365541 A1 Nov. 27, 2025

(30) Foreign Application Priority Data

May 23, 2024 (CN) ........................ 202410643513.8

(51) Int. Cl.
*H04R 9/04* (2006.01)
*H04R 3/00* (2006.01)
*H04R 9/06* (2006.01)

(52) U.S. Cl.
CPC ............... *H04R 9/045* (2013.01); *H04R 3/00* (2013.01); *H04R 9/06* (2013.01)

(58) Field of Classification Search
CPC . H04R 9/045; H04R 3/00; H04R 9/06; H04R 1/06; H04R 9/043; H04R 7/20; H04R 9/02
See application file for complete search history.

(56) References Cited

U.S. PATENT DOCUMENTS

| | | | | |
|---|---|---|---|---|
| 6,655,495 B2 * | 12/2003 | Kuze | H04R 9/043 | 181/173 |
| 2004/0001603 A1 * | 1/2004 | Sahyoun | H04R 1/06 | 381/407 |
| 2006/0159300 A1 * | 7/2006 | Ohara | H04R 9/043 | 381/404 |

(Continued)

FOREIGN PATENT DOCUMENTS

| | | |
|---|---|---|
| CN | 204069318 U | 12/2014 |
| CN | 212936186 U | 4/2021 |

(Continued)

*Primary Examiner* — Matthew A Eason
(74) *Attorney, Agent, or Firm* — Birch, Stewart, Kolasch & Birch, LLP

(57) ABSTRACT

A speaker structure includes a magnetic conductive carrier plate, a magnetic assembly, an outer frame and a vibration assembly. The magnetic assembly locates on the magnetic conductive carrier plate and forms a magnetic gap area. The outer frame locates on the magnetic assembly. The vibration assembly includes a flexible circuit unit, a vibrating unit and a voice coil. The flexible circuit unit includes an outer fixed rack, a connecting rack and an inner fixed rack. The thickness of the outer fixed rack is greater than connecting rack. The thickness of the connecting rack is greater than inner fixed rack. The flexible circuit unit locates on the magnetic assembly. The outer fixed rack disposes on the outer frame. The voice coil disposes on the inner fixed rack of the flexible circuit unit. The voice coil locates within the magnetic gap area. The vibrating unit disposes on the flexible circuit unit.

20 Claims, 8 Drawing Sheets

(56) References Cited

U.S. PATENT DOCUMENTS

| | | | | |
|---|---|---|---|---|
| 2007/0189576 A1* | 8/2007 | Chan | H04R 9/06 381/396 |
| 2010/0172535 A1* | 7/2010 | Huang | H04R 7/20 381/404 |
| 2011/0075880 A1* | 3/2011 | Kamimura | H04R 9/10 381/413 |
| 2012/0177244 A1* | 7/2012 | Liu | H04R 7/18 381/396 |

FOREIGN PATENT DOCUMENTS

| | | | | |
|---|---|---|---|---|
| CN | 213028533 | U | | 4/2021 |
| CN | 112449288 | B | | 3/2022 |
| CN | 216451533 | U | | 5/2022 |
| CN | 216852501 | U | | 6/2022 |
| CN | 217160006 | U | | 8/2022 |
| CN | 217935867 | U | | 11/2022 |
| CN | 219372586 | U | | 7/2023 |
| CN | 116709121 | A | | 9/2023 |
| JP | 09322290 | A | * | 12/1997 |
| TW | M404556 | U1 | | 5/2011 |
| TW | M664712 | U | | 12/2024 |
| WO | WO 2019/205658 | A1 | | 10/2019 |

* cited by examiner

141

SPEAKER STRUCTURE

CROSS-REFERENCE TO RELATED APPLICATIONS

This non-provisional application claims priority claim under 35 U.S.C. § 119(a) on Chinese Patent Application No. 202410643513.8 filed May 23, 2024, the entire contents of which are hereby incorporated by reference.

BACKGROUND

1. Technical Field

The present application relates to the technical field of speaker structures, and in particular to a speaker structure.

2. Description of the Related Art

In existing technology, with the improvement of the quality of life and the popularization of smart mobile devices, people are constantly pursuing the function of delicate sound quality and stable music playback for portable speakers. Current speakers are mainly composed of magnets, coils and diaphragms, and the speakers convert the vibration of the current frequency into sound. However, if the speaker operates for prolonged periods at high-frequency vibrations, it can lead to coil or flexible circuit board damage due to the sustained rapid movement.

SUMMARY

The present application provides a speaker structure designed to address the issue of coil or flexible circuit unit damage within speakers caused by prolonged high-frequency vibrations during sound production.

In order to solve the above technical problems, the present application is implemented as follows:

A speaker structure includes a magnetic conductive carrier plate, a magnetic assembly, an outer frame and a vibration assembly. The magnetic assembly locates on the magnetic conductive carrier plate and is configured to form a magnetic gap area; the outer frame locates around a periphery of the magnetic assembly; the vibration assembly includes a flexible circuit unit, a vibrating unit and a voice coil, the flexible circuit unit includes an outer fixed rack, a connecting rack and an inner fixed rack, the connecting rack is connecting between the outer fixed rack and the inner fixed rack, wherein the thickness of the outer fixed rack is greater than the thickness of the connecting rack, the thickness of the connecting rack is greater than the thickness of the inner fixed rack, the flexible circuit unit locates on the magnetic assembly, the outer fixed rack of the flexible circuit unit is disposed on the outer frame, the voice coil is disposed on the inner fixed rack of the flexible circuit unit, the voice coil locates within the magnetic gap area, the vibrating unit is disposed on the flexible circuit unit.

According to one embodiment of the present application, the outer fixed rack includes a first outer cladding unit, a second outer cladding unit and an outer substrate, the outer substrate is disposed on the first outer cladding unit, the second outer cladding unit is disposed on the outer substrate.

According to one embodiment of the present application, the outer substrate includes an outer substrate layer, a first outer conductive layer and a second outer conductive layer, the first outer cladding unit includes a first outer cladding layer and a first outer adhesive layer, a second outer cladding unit includes a second outer cladding layer and a second outer adhesive layer, the first outer conductive layer and the second outer conductive layer are disposed on two sides of the outer substrate layer, the first outer adhesive layer covers an outer side of first outer conductive layer, the first outer cladding layer is disposed on the outer side of the first outer adhesive layer, second outer adhesive layer covers the outer side of the second outer conductive layer, the second outer cladding layer is disposed on the outer side of the second outer adhesive layer.

According to one embodiment of the present application, the first outer cladding unit further includes a first auxiliary adhesive layer and a first auxiliary cladding layer, the first auxiliary adhesive layer is disposed on the outer side of the first outer cladding layer, the first auxiliary cladding layer is disposed on the outer side of the first auxiliary adhesive layer.

According to one embodiment of the present application, the speaker structure further includes a conducting unit, the conducting unit is disposed on the outer frame, the flexible circuit unit further includes an external conductive portion, the external conductive portion extends inward from the outer fixed rack, one end of conducting unit is electrically connected to the external conductive portion, another end of the conducting unit protrudes from the outer frame.

According to one embodiment of the present application, the connecting rack includes a connecting substrate, a first connecting unit and a second connecting unit, the connecting substrate is disposed on the first connecting unit, the second connecting unit is disposed on the connecting substrate.

According to one embodiment of the present application, the connecting substrate includes a connecting substrate layer and a connecting conductive layer, the first connecting unit includes a first connecting cladding layer and a first connecting adhesive layer, the second connecting unit includes a second connecting cladding layer and a second connecting adhesive layer, the connecting conductive layer is disposed on one side of the connecting substrate layer, the first connecting adhesive layer covers the outer side of the first connecting conductive layer, the first connecting cladding layer is disposed on the outer side of the first connecting adhesive layer, the second connecting adhesive layer is disposed on another side of the connecting substrate layer, the second connecting cladding layer is disposed on the outer side of the second connecting adhesive layer.

According to one embodiment of the present application, the inner fixed rack includes an inner substrate and an inner cladding unit, the inner substrate is disposed on inner cladding unit.

According to one embodiment of the present application, the inner substrate includes an inner substrate and an inner conductive layer, the inner cladding unit includes an inner cladding layer and an inner adhesive layer, the inner conductive layer is disposed on a side of the inner substrate, the inner adhesive layer covers the outer side of the inner conductive layer, the inner cladding layer is disposed on the outer side of the inner adhesive layer.

According to one embodiment of the present application, the flexible circuit unit further includes an internal conductive portion, internal conductive portion extends inward from the inner fixed rack, the internal conductive portion is electrically connected between the inner conductive layer and the voice coil.

According to one embodiment of the present application, the magnetic assembly includes a main magnet, a subordinate magnet, a main magnetic conductive element and a subordinate magnetic conductive element, the main magnet and the subordinate magnet are disposed on the magnetic conductive carrier plate, the subordinate magnet locates on the outer side of the main magnet, the magnetic gap area is formed between the main magnet and the subordinate magnet, the main magnetic conductive element is disposed on the main magnet, the subordinate magnetic conductive element is disposed on the subordinate magnet, wherein the main magnetic conductive element has a notch, the notch locates on path of the vertical vibration of the internal conductive portion.

According to one embodiment of the present application, the inner side of the outer frame further includes a plurality of inner fixed grooves, the subordinate magnetic conductive element has a plurality of outer fixed portions corresponding to the plurality of inner fixed grooves, the plurality of outer fixed portions of the subordinate magnetic conductive element are engaged with the plurality of the inner fixed groove of the outer frame.

According to one embodiment of the present application, the magnetic conductive carrier plate has a fixed protrusion, the outer frame has a recess corresponding to the fixed protrusion, the outer frame is disposed on the outer side of the magnetic conductive carrier plate, the fixed protrusion of the magnetic conductive carrier plate is engaged with the recess of the outer frame.

According to one embodiment of the present application, the speaker structure further includes a dust screen, two sides of the outer frame has an openwork portion, the openwork portion has an air vent, the dust screen is disposed on the openwork portion, and dust screen seals the air vent.

According to one embodiment of the present application, the outer fixed rack, the connecting rack and substrate structure of the inner fixed rack are integrally formed.

According to one embodiment of the present application, there are three connecting racks, one end of each the connecting rack is bent inwardly from the outer fixed rack and connected to the inner fixed rack.

According to one embodiment of the present application, the vibration assembly further includes a retaining ring, the retaining ring is disposed between the flexible circuit unit and the vibrating unit.

According to one embodiment of the present application, the vibrating unit further includes a vibration membrane portion and a flange ring, the inner side of the flange ring is arranged around the periphery of the vibration membrane portion, the outer side of the flange ring is disposed on the retaining ring.

According to one embodiment of the present application, the outer frame further includes a plurality of convex, the retaining ring is set around the outer side of the plurality of the convex.

According to one embodiment of the present application, the outer frame further includes a plurality of fixed grooves, the outer fixed rack of the flexible circuit unit is adhered to the plurality of the fixed grooves of the outer frame and a surface of a periphery of the opening of the plurality of the fixed grooves.

The present application provides a speaker structure, which adjusts the structural toughness and strength of the flexible circuit unit by different thicknesses of the outer fixed rack, the connecting rack and the inner fixed rack of the flexible circuit unit of the vibration assembly. When the speaker structure vibrates and produces sound, the flexible circuit unit will be affected by the vibration under the condition of bearing weight, thereby causing structural deformation of the flexible circuit unit. By employing the outer fixed rack, the connecting rack and the inner fixed rack with varying thicknesses, the structural strength of the flexible circuit unit is increased, thereby extending the service life of the flexible circuit unit.

BRIEF DESCRIPTION OF THE DRAWINGS

The drawings described herein are used to provide further understanding of the present application and constitute a part of it. The schematic implementation scheme of the present application and its description are used to explain the present application and do not constitute improper limitations on it. In the drawings.

DETAILED DESCRIPTION OF THE EMBODIMENTS

Figure 1:
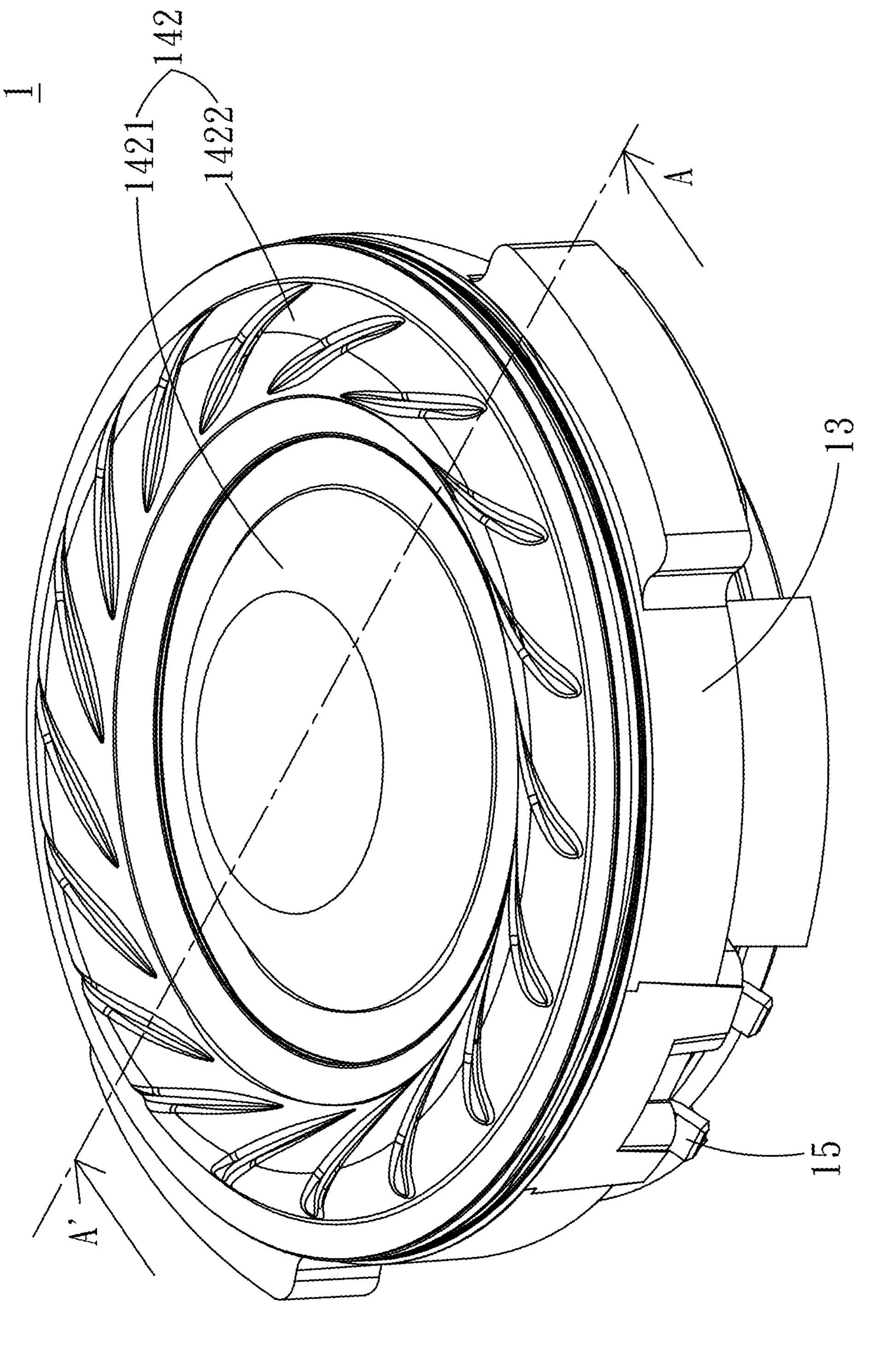
FIG. 1 is a perspective view of the speaker structure of the present application.

The following will disclose multiple embodiments of the present application with drawings. For the purpose of clear description, many implementation details will be described together in the following narrative. However, it should be understood that these implementation details should not be used to limit the present application. In other words, in some embodiments of this application, these implementation details are not essential. Furthermore, for simplicity in the drawings, some conventional structures and components will be depicted in a simplified schematic manner. In the following embodiments, the same or similar components will be denoted by the same reference numerals.

Figure 2:
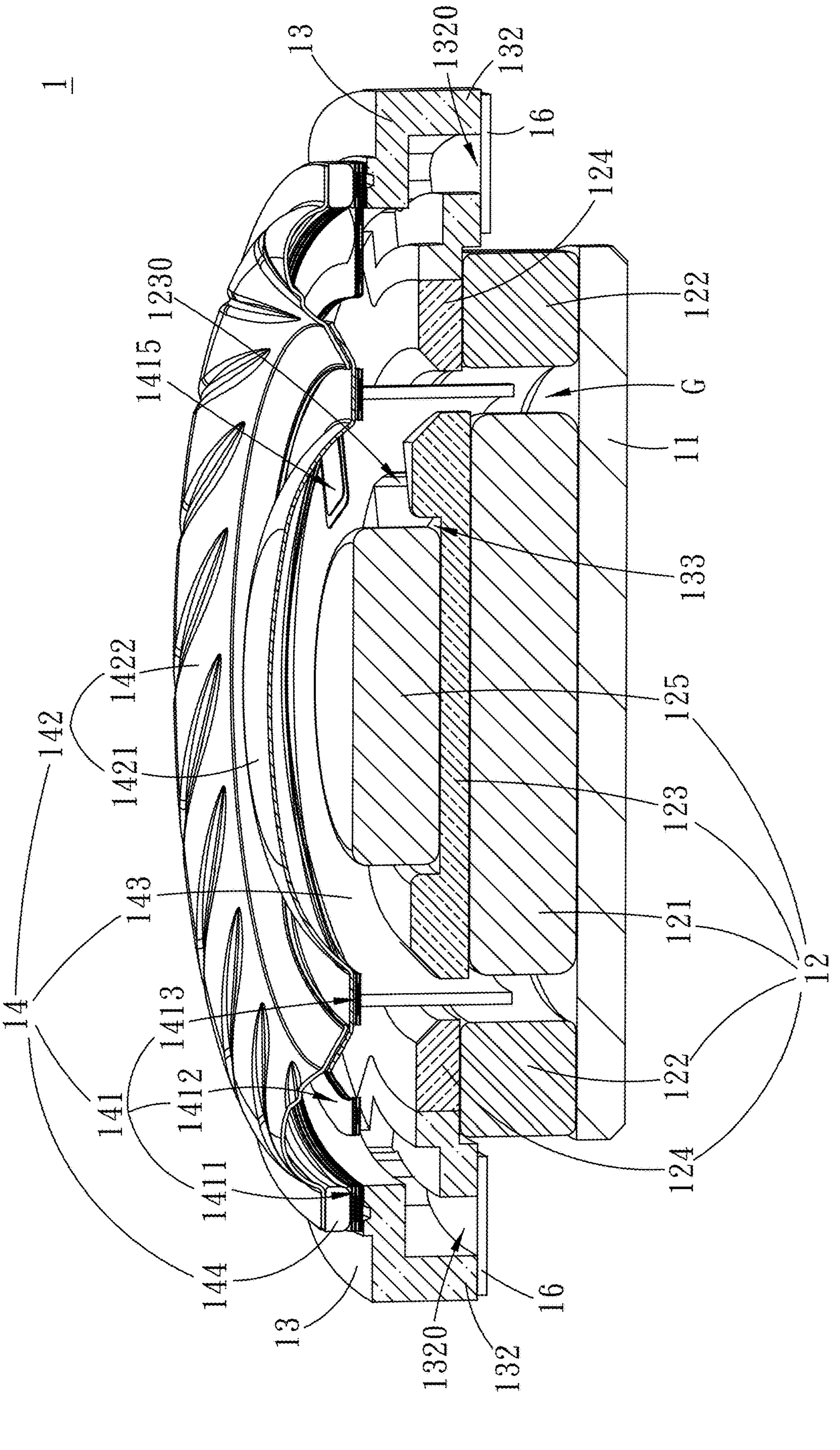
FIG. 2 is a cross-sectional perspective view along line A-A' of FIG. 1.
Figure 3:
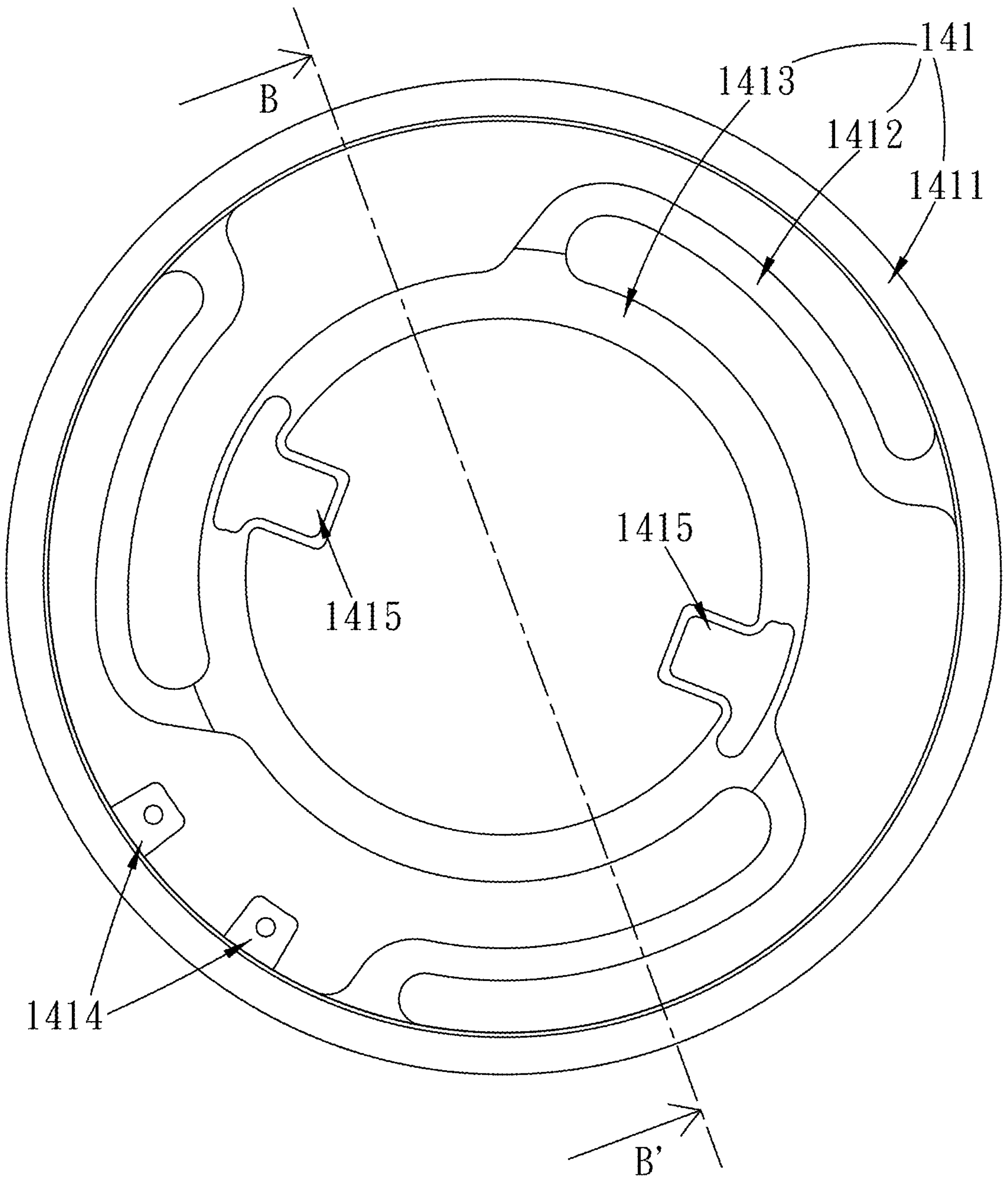
FIG. 3 is a schematic diagram of the flexible circuit unit of the speaker structure of the present application.

Please refer to FIG. 1 to FIG. 3. FIG. 1 is a perspective view of the speaker structure of the present application, FIG. 2 is a cross-sectional perspective view along line A-A' of FIG. 1 and FIG. 3 is a schematic diagram of the flexible circuit unit of the speaker structure of the present application. As shown in FIG. 1 to FIG. 3, the present application provides a speaker structure 1 includes a magnetic conductive carrier plate 11, a magnetic assembly 12, an outer frame 13 and a vibration assembly 14. The magnetic assembly 12 locates on the magnetic conductive carrier plate 11 and is configured to form a magnetic gap area G. The outer frame 13 locates on a periphery of the magnetic assembly 12. The vibration assembly 14 includes a flexible circuit unit 141, a vibrating unit 142 and a voice coil 143, the flexible circuit unit 141 includes an outer fixed rack 1411, a connecting rack 1412 and an inner fixed rack 1413, the connecting rack 1412 is connecting between the outer fixed rack 1411 and the inner fixed rack 1413, wherein the thickness of the outer fixed rack 1411 is greater than the thickness of the connecting rack 1412, the thickness of the connecting rack 1412 is greater than the thickness of the inner fixed rack 1413. The flexible circuit unit 141 locates on the magnetic assembly 12, the outer fixed rack 1411 of the flexible circuit unit 141 is disposed on the outer frame 13, the voice coil 143 is disposed on the inner fixed rack 1413 of the flexible circuit unit 141, the voice coil 143 locates within the magnetic gap area G formed by the magnetic assembly 12, the vibrating unit 142 is disposed on the flexible circuit unit 141.

Figure 8:
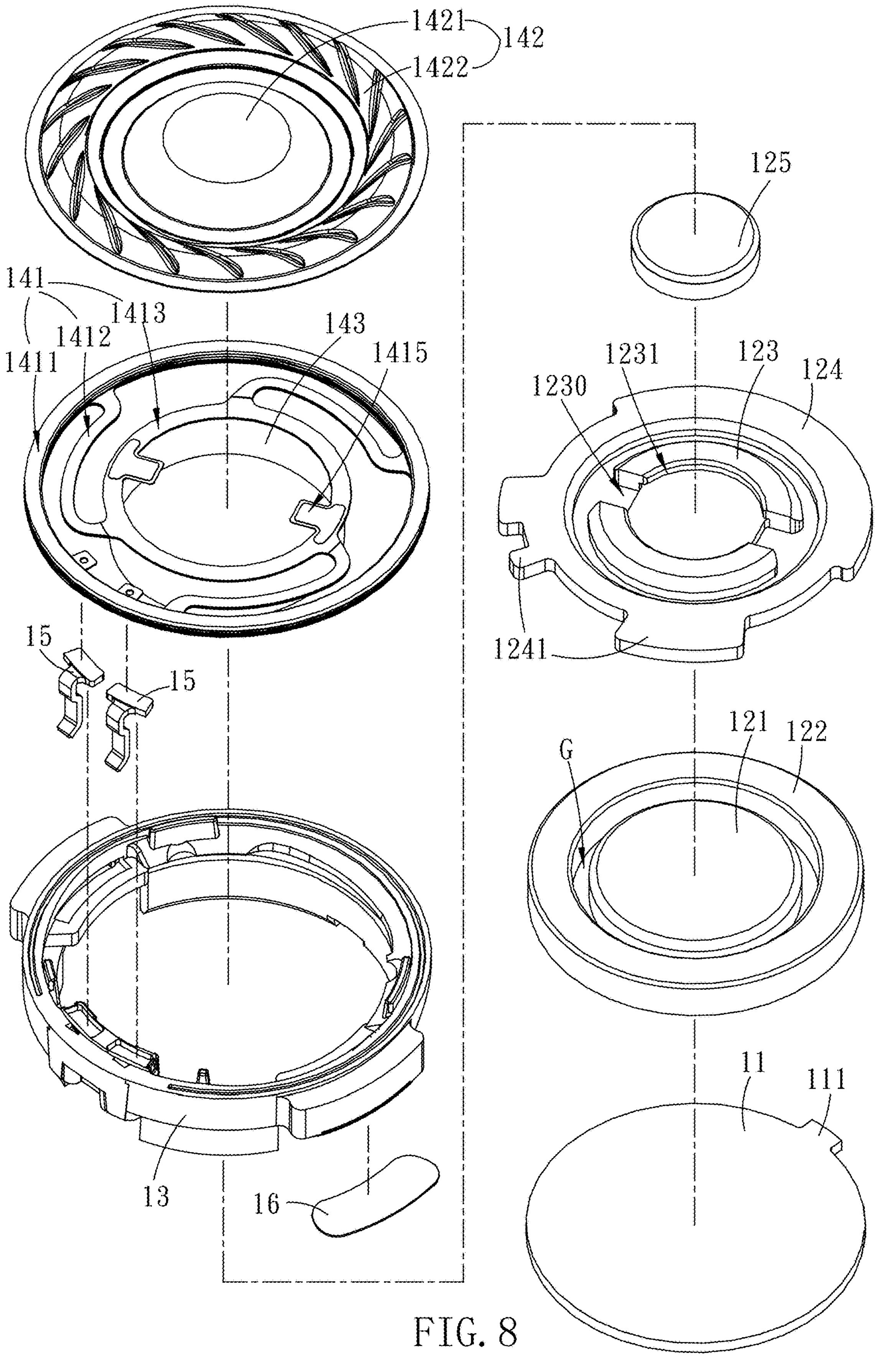
FIG. 8 is an exploded view of the speaker structure of the present application.
Figure 9:
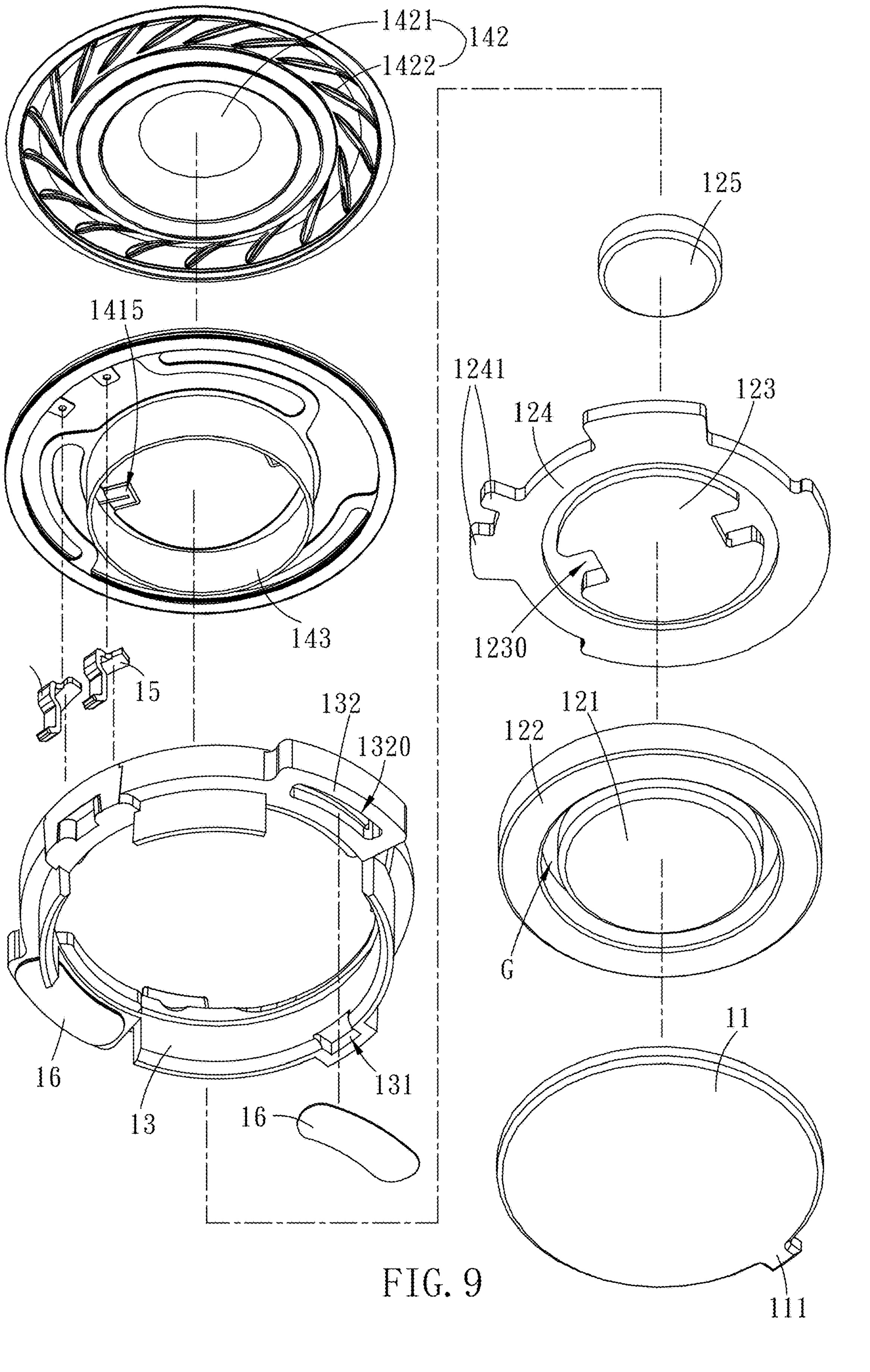
FIG. 9 is another exploded view of the speaker structure of the present application.

Please refer to FIG. 2 together with FIG. 8 and FIG. 9, in this embodiment, the magnetic assembly 12 includes a main magnet 121, a subordinate magnet 122, a main magnetic conductive element 123 and a subordinate magnetic conductive element 124, the main magnet 121 and the subordinate magnet 122 are disposed on the magnetic conductive carrier plate 11, the subordinate magnet 122 locates on the an outer side of the main magnet 121, the magnetic gap area G is formed between the main magnet 121 and the subordinate magnet 122, i.e., the interval space between the main magnet 121 and the subordinate magnet 122. The main magnetic conductive element 123 is disposed on the main magnet 121, the subordinate magnetic conductive element 124 is disposed on the subordinate magnet 122, the subordinate magnet 122 is annular and arranged around the main magnet 121. The main magnet 121 and the subordinate magnet 122 can increase the number of magnetic field lines and provide stronger magnetic field intensity, thereby exerting a greater magnetic force on the voice coil 143.

Based on the above description, the magnetic assembly 12 further includes an auxiliary magnet 125, which is disposed on the main magnetic conductive element 123. The auxiliary magnet 125 locates within the voice coil 143, i.e., the voice coil 143 extends downward from the flexible circuit unit 141 and surrounds the outer periphery of the auxiliary magnet 125. The voice coil 143 further extends further downward between the main magnet 121 and the subordinate magnet 122. Furthermore, the main magnetic conductive element 123 has an accommodating groove 1231, the auxiliary magnet 125 is disposed within the accommodating groove 1231, such that the accommodating groove 1231 increases the space available for placing the auxiliary magnet 125, and serves as a structural fixture for securing the auxiliary magnet 125. In this embodiment, the auxiliary magnet 125 can increase the magnetic flux of the magnetic assembly 12 to enhance the magnetic field strength of the magnetic assembly 12.

Figure 4:
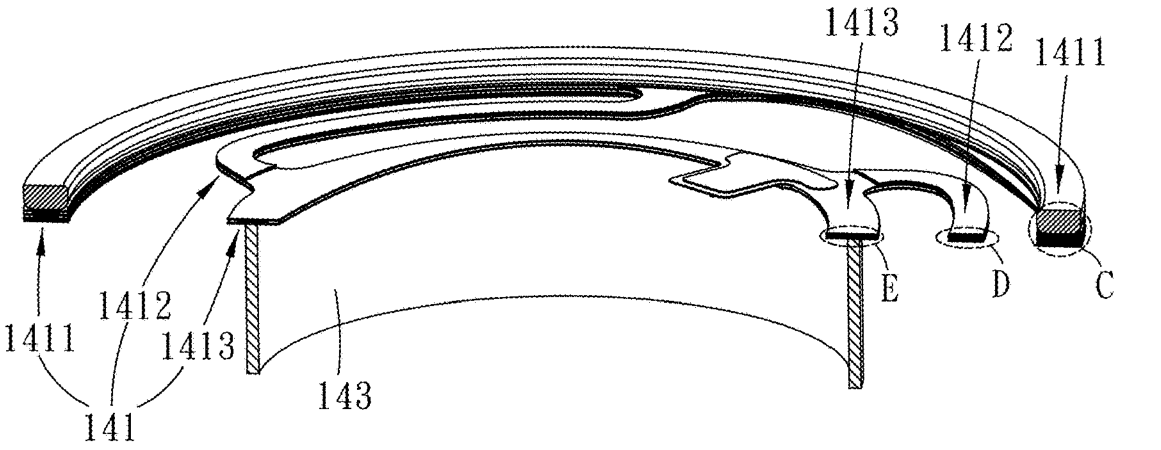
FIG. 4 is a cross-sectional perspective view along line B-B' of FIG. 3.
Figure 5:
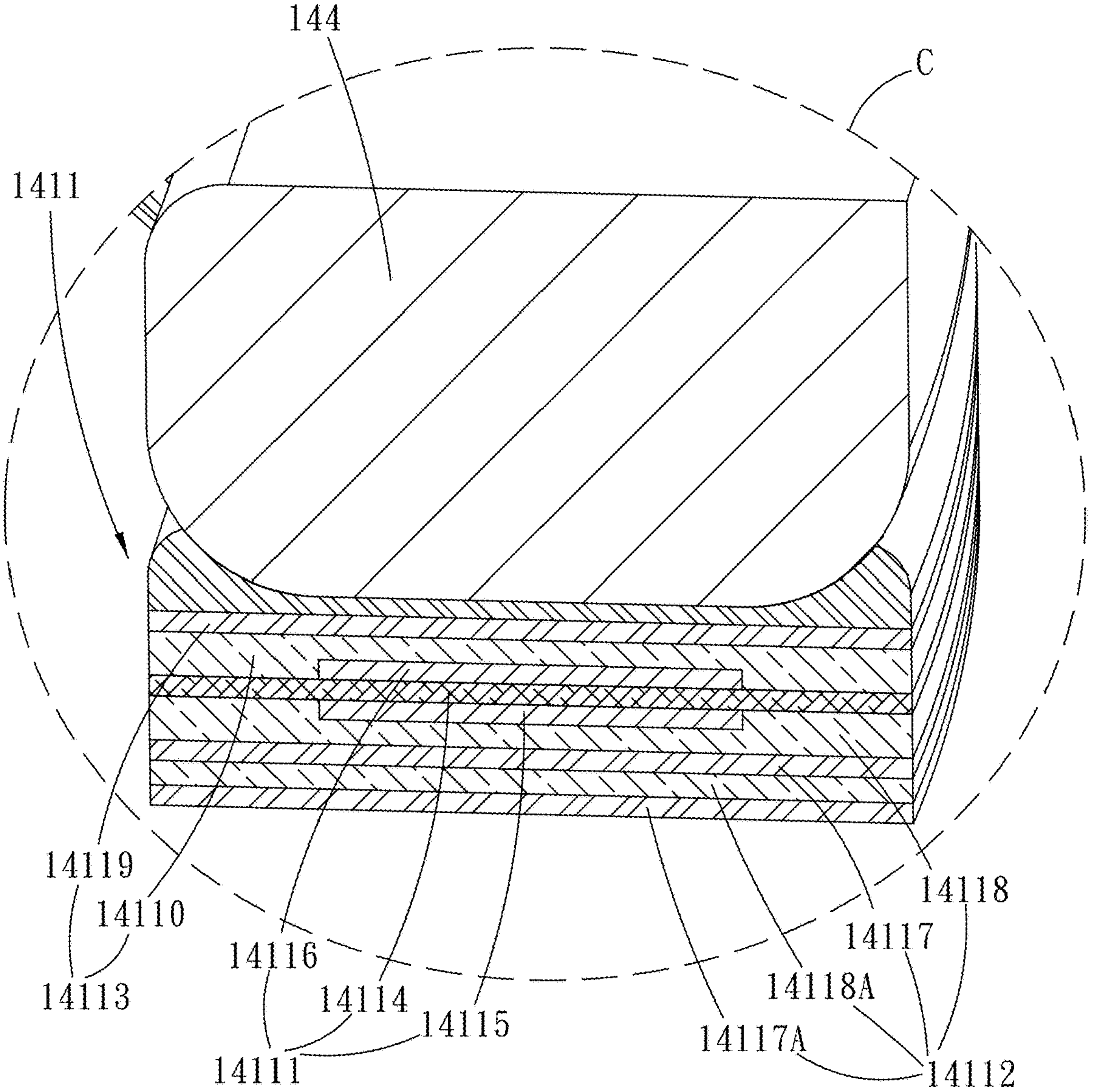
FIG. 5 is an enlarged view of region C in FIG. 4.
Figure 6:
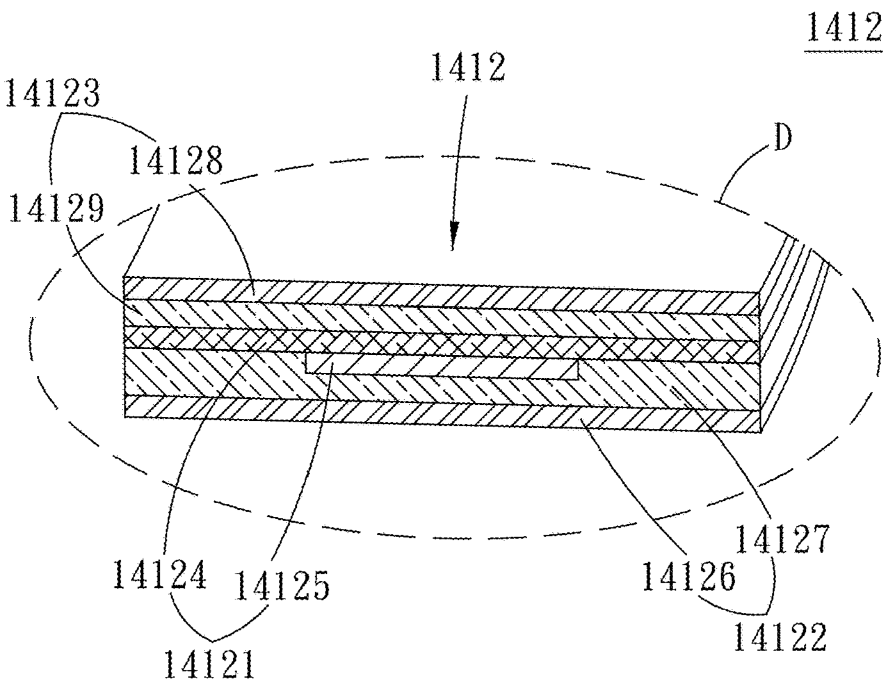
FIG. 6 is an enlarged view of region D in FIG. 4.
Figure 7:
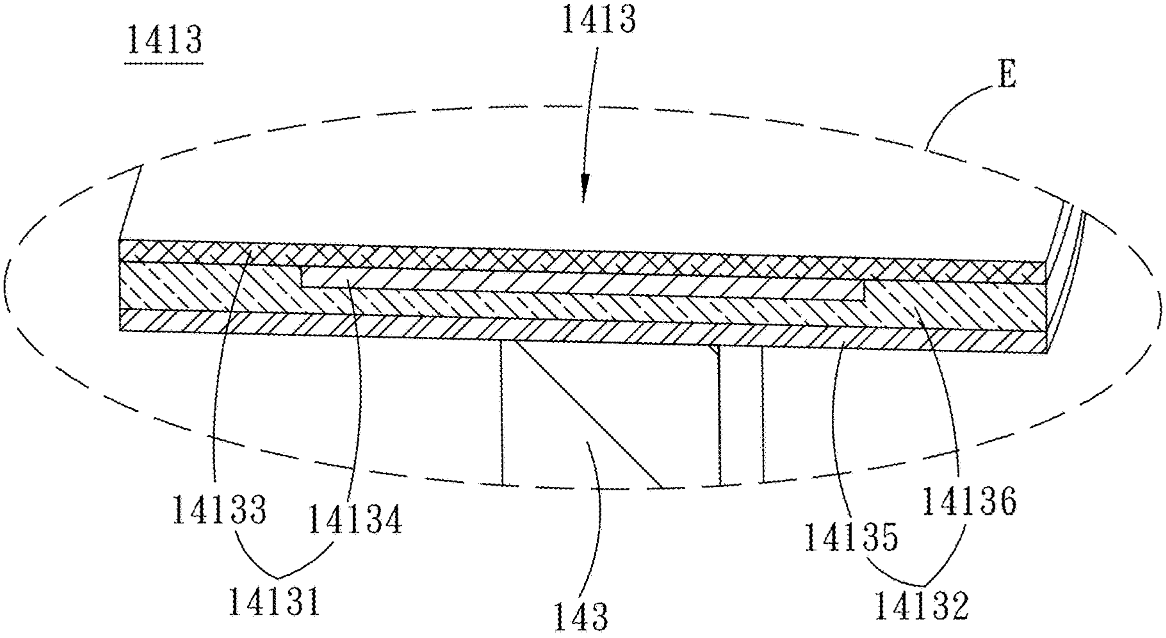
FIG. 7 is an enlarged view of region E in FIG. 4.

Please refer to FIG. 4 to FIG. 7, FIG. 4 is a cross-sectional perspective view along line B-B' of FIG. 3, FIG. 5 is an enlarged view of region C in FIG. 4, FIG. 6 is an enlarged view of region D in FIG. 4 and FIG. 7 is an enlarged view of region E in FIG. 4. As shown in FIG. 4 to FIG. 7, in this embodiment, the flexible circuit unit 141 includes an outer fixed rack 1411, a connecting rack 1412 and an inner fixed rack 1413. There are three connecting racks 1412 and one end of each connecting rack 1412 is bent inwardly from the outer fixed rack 1411 and connected to the inner fixed rack 1413, i.e., the connecting rack 1412 has a S-shaped curved structure. In addition, the vibrating unit 142 further includes a vibration membrane portion 1421 and a flange ring 1422. The inner side of the flange ring 1422 is placed around the periphery of the vibration membrane portion 1421. The inner side of the flange ring 1422 and the periphery of the vibration membrane portion 1421 are attached by glue. The outer side of the flange ring 1422 is disposed on the outer fixed rack 1411 of the flexible circuit unit 141. The connection between the vibration membrane portion 1421 and the flange ring 1422 is disposed on the inner fixed rack 1413 of the flexible circuit unit 141. Therefore, the flexible circuit unit 141 and the vibrating unit 142 are interconnected to vibrate together.

Please to FIG. 5 again, in this embodiment, the outer fixed rack 1411 includes an outer substrate 14111, a first outer cladding unit 14112 and a second outer cladding unit 14113. The outer substrate 14111 is disposed on the first outer cladding unit 14112; the second outer cladding unit 14113 is disposed on the outer substrate 14111. The outer substrate 14111 includes an outer substrate layer 14114, a first outer conductive layer 14115 and a second outer conductive layer 14116. The first outer cladding unit 14112 includes a first outer cladding layer 14117 and a first outer adhesive layer 14118. The second outer cladding unit 14113 includes a second outer cladding layer 14119 and a second outer adhesive layer 14110. The second outer conductive layer 14116 are disposed on two sides of the outer substrate layer 14114; the first outer adhesive layer 14118 covers the outer side of the first outer conductive layer 14115; the first outer adhesive layer 14118 covers a surface of the outer substrate layer 14114. The first outer cladding layer 14117 is disposed on the outer side of the first outer adhesive layer 14118. The second outer adhesive layer 14110 covers the outer side of the second outer conductive layer 14116, the second outer adhesive layer 14110 covers another surface of the outer substrate layer 14114. The second outer cladding layer 14119 is disposed on the outer side of the second outer adhesive layer 14110.

Furthermore, the first outer cladding unit 14112 further includes a first auxiliary cladding layer 14117A and a first auxiliary adhesive layer 14118A. The first auxiliary adhesive layer 14118A is disposed on the outer side of the first outer cladding layer 14117 and the first auxiliary cladding layer 14117A is disposed on the outer side of the first auxiliary adhesive layer 14118A, thereby increasing the overall thickness of the outer fixed rack 1411 of the flexible circuit unit 141. The thickness of the flexible circuit unit 141 can be adjusted by users by using the above method.

Please to FIG. 6 again, in this embodiment, the connecting rack 1412 includes a connecting substrate 14121, a first connecting unit 14122 and a second connecting unit 14123. The connecting substrate 14121 is disposed on the first connecting unit 14122. The second connecting unit 14123 is disposed on the connecting substrate 14121. The connecting substrate 14121 includes a connecting substrate layer 14124 and a connecting conductive layer 14125. The first connecting unit 14122 includes a first connecting cladding layer 14126 and a first connecting adhesive layer 14127. The second connecting unit 14123 includes a second connecting cladding layer 14128 and a second connecting adhesive layer 14129. The connecting conductive layer 14125 is disposed on one side of the connecting substrate layer 14124; the first connecting adhesive layer 14127 covers the outer side of the connecting conductive layer 14125; the first connecting adhesive layer 14127 covers the surface of the connecting substrate layer 14124. The first connecting cladding layer 14126 is disposed on the outer side of the first connecting adhesive layer 14127; the second connecting adhesive layer 14129 is disposed on another side of the connecting substrate layer 14124; the second connecting cladding layer 14128 is disposed on the outer side of the second connecting adhesive layer 14129.

Please to FIG. 7 again, in this embodiment, the inner fixed rack 1413 includes an inner substrate 14131 and an inner cladding unit 14132. The inner substrate 14131 is disposed on the inner cladding unit 14132. The inner substrate 14131 includes an inner substrate 14133 and an inner conductive layer 14134. The inner cladding unit 14132 includes an inner cladding layer 14135 and an inner adhesive layer 14136. The inner conductive layer 14134 is disposed on one side of the inner substrate 1413; the inner adhesive layer 14136 covers the outer side of the inner conductive layer 14134; the inner adhesive layer 14136 covers the surface of the inner substrate 14133. The inner cladding layer 14135 is disposed on the outer side of the inner adhesive layer 14136.

In this embodiment, the outer fixed rack 1411, the connecting rack 1412 and a substrate structure of the inner fixed rack 1413 are integrally formed. Users can add conductive layers, adhesive layers, and cladding layers on the substrate structure of the flexible circuit unit 141 to adjust the respective thicknesses of the outer fixed rack 1411 of the flexible circuit unit 141, the connecting rack 1412 and the inner fixed rack 1413. The outer substrate layer 14114 of the outer fixed rack 1411, the connecting substrate layer 14124 of the connecting rack 1412, and the inner substrate 14133 of the inner fixed rack 1413 are integrated into the substrate structure. In addition, the first outer conductive layer 14115 and the second outer conductive layer 14116 of the outer fixed rack 1411, the connecting conductive layer 14125 of the connecting rack 1412, and the inner conductive layer 14134 of the inner fixed rack 1413 are electrically connected to each other.

Further, the speaker structure 1 further includes a conducting unit 15, the conducting unit 15 is disposed on the outer frame 13, the outer frame 13 is set on the subordinate magnetic conductive element 124 and the conducting unit 15 through injection molding. The outer frame 13, the conducting unit 15, the subordinate magnetic conductive element 124 are fixedly connected. The flexible circuit unit 141 further includes an external conductive portion 1414, which extends inward from the outer fixed rack 1411. One end of the conducting unit 15 is electrically connected to the external conductive portion 1414. Another end of the conducting unit 15 protrudes from the outer frame 13. Therefore, the external conductive portion 1414 and the conducting unit 15 are used to electrically connect to the external power supply of the speaker structure 1. In addition, the flexible circuit unit 141 further includes an internal conductive portion 1415, which extends inward from the inner fixed rack 1413. The internal conductive portion 1415 is electrically connected between the inner conductive layer 14134 and the voice coil 143. The internal conductive portion 1415 is used to supply power to the voice coil 143 to change the magnetic field, such that the voice coil 143 and the magnetic assembly 12 vibrate due to the magnetic field, thereby linking the flexible circuit unit 141 and the vibrating unit 142 to vibrate and produce sound. In other words, the main magnetic conductive element 123 has a notch 1230, the notch 1230 locates on the path of the vertical vibration of the internal conductive portion 1415. This prevents the vibration space of the internal conductive portion 1415 of the flexible circuit unit 141 from being restricted, thereby avoiding any impact on the internal vibrations of the speaker structure 1.

In this embodiment, when the speaker structure 1 is powered on, the external audio power source is connected via the conducting unit 15 of the outer frame 13. After the conducting unit 15 transmits the audio current sequentially through the external conductive portion 1414, the first outer conductive layer 14115 and the second outer conductive layer 14116 of the outer fixed rack 1411, the connecting conductive layer 14125 of the connecting rack 1412, the inner conductive layer 14134 of the inner fixed rack 1413, the internal conductive portion 1415 and the voice coil 143, the voice coil 143 generates a magnetic field consequently. The voice coil 143 is also influenced by the magnetic field of the magnetic assembly 12, causing the voice coil 143 to actuate the flexible circuit unit 141 and the vibrating unit 142 to produce sound. Furthermore, the flexible circuit unit 141 in this embodiment maintains better structural balance through its design with different thicknesses. This allows the flexible circuit unit 141 to withstand significant movements during the up-and-down vibrations of the voice coil 143. Additionally, the flexible circuit unit 141 can use the thicker outer fixed rack 1411 as a damper to balance the movements or vibrations of the magnetic assembly 12 within the speaker structure 1. This also reduces the impact of other external forces or interferences from the environment.

In this embodiment, flexible circuit unit 141 has an annular structure. The outer fixed rack 1411, the connecting rack 1412 and the inner fixed rack 1413 of the flexible circuit unit 141 respectively adopt different thicknesses and different laminated structures to improve the structural strength and structural flexibility of the flexible circuit unit 141, and can reduce the weight of part of the flexible circuit unit 141. As a result, the sound speaker structure 1 can still maintain normal use for a long time under high-frequency vibration conditions, thereby improving the service life of the sound the speaker structure 1.

Please refer to FIG. 2, FIG. 8 is an exploded view of the speaker structure of the present application and FIG. 9 is another exploded view of the speaker structure of the present application. The magnetic conductive carrier plate 11 has a fixed protrusion 111 and the outer frame 13 has recess 131 corresponding to the fixed protrusion 111. The outer frame 13 is disposed on the outer side of the magnetic conductive carrier plate 11. The fixed protrusion 111 of the magnetic conductive carrier plate 11 is engaged with recess 131 of outer frame 13. Therefore, the magnetic conductive carrier plate 11 is combined with the outer frame 13, so that there is no offset rotation between the magnetic conductive carrier plate 11 and the outer frame 13. Furthermore, the speaker structure 1 further includes a dust screen 16; two sides of the outer frame 13 has an openwork portion 132, the openwork portion 132 has an air vent 1320. The dust screen 16 is disposed on the openwork portion 132, and the dust screen 16 seals the air vent 1320. Therefore, the airflow introduced from the air vent 1320 flows into the interior of the speaker structure 1, so as to facilitate the vibration and sound generation inside the speaker structure 1. At the same time, the dust screen 16 can also prevent dirt and dust from entering the speaker structure 1.

Figure 10:
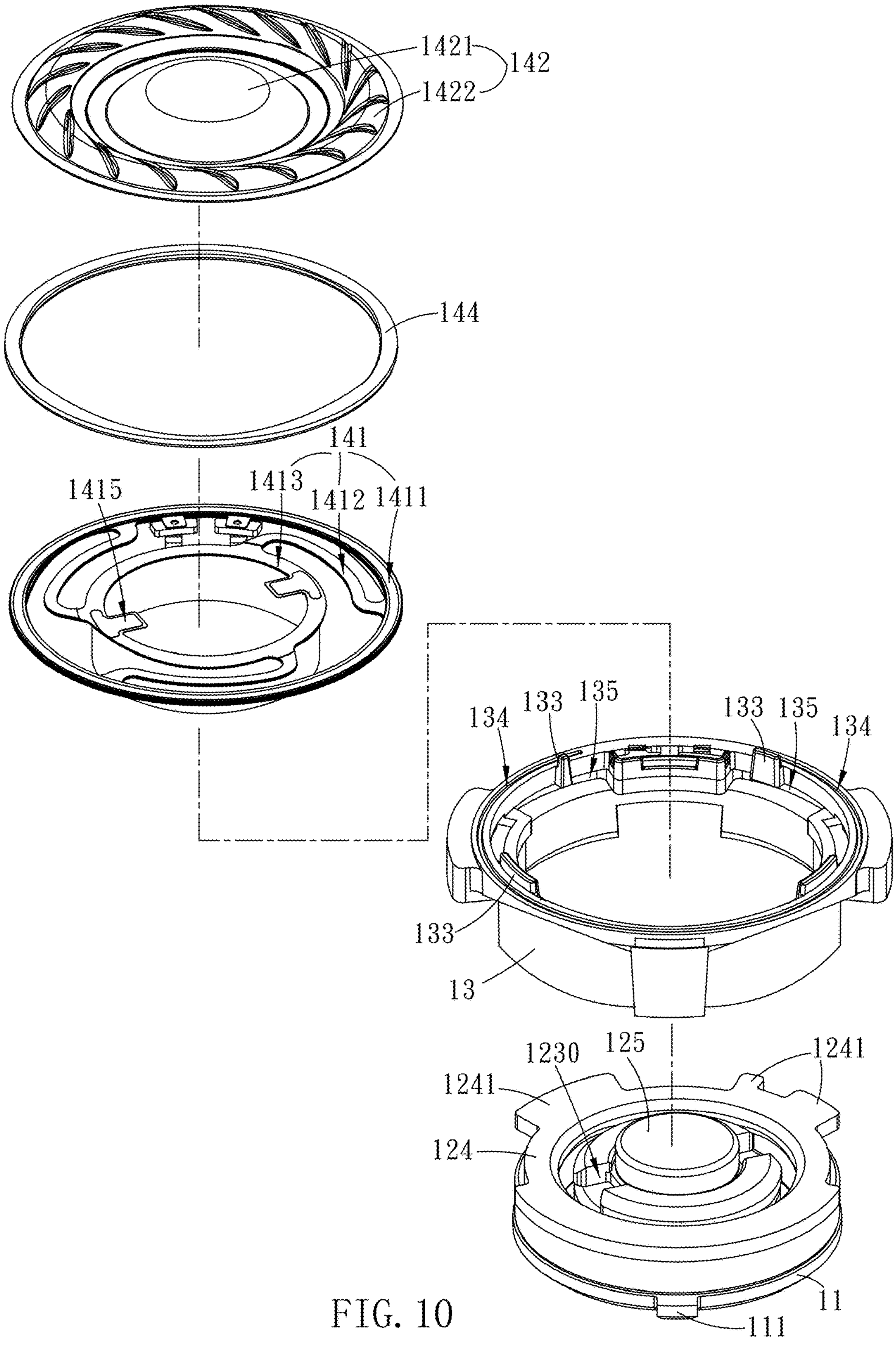
FIG. 10 is yet another exploded view of the speaker structure of the present application.

Please refer to FIG. 10. FIG. 10 is yet another exploded view of the speaker structure of the present application. As shown in FIG. 10, in this embodiment, the vibration assembly 14 further includes a retaining ring 144. The retaining ring 144 is disposed between the flexible circuit unit 141 and the vibrating unit 142. The retaining ring 144 attaches to the flange ring 1422 of the vibrating unit 142 by glue. The outer frame 13 further includes a plurality of convex 133; the retaining ring 144 is set on the outer side of the plurality of convex 133. The retaining ring 144 can be used as an auxiliary structure for fixing the vibrating unit 142 to the outer frame 13. In addition, the outer frame 13 further includes a plurality of fixed grooves 134; the outer fixed rack 1411 of the flexible circuit unit 141 is adhered to the plurality of the fixed grooves 134 of the outer frame 13 and a surface of a periphery of the opening of the plurality of the fixed grooves 134. The plurality of the fixed grooves 134 can increase the adhesive area and the post-adhesion fixation strength of the outer fixed rack 1411 of the flexible circuit unit 141 to the outer frame 13. Moreover, the inner side of the outer frame 13 further includes the plurality of the inner fixed grooves 135; the subordinate magnetic conductive element 124 has a plurality of the outer fixed portions 1241 corresponding to the plurality of the inner fixed grooves 135. The plurality of the outer fixed portions 1241 of the subordinate magnetic conductive element 124 are engaged with the plurality of the inner fixed grooves 135 of the outer frame 13. Therefore, the position of the subordinate magnetic conductive element 124 is fixed by the outer frame 13. This embodiment does not limit the shapes of the inner fixed groove 135 and the outer fixed portion 1241. The shapes of the inner fixed groove 135 and the outer fixed portion 1241 can be adjusted according to the user's needs.

To sum up, the present application provides a speaker structure that adjusts the structural flexibility and strength of the flexible circuit unit by varying the thicknesses of the outer fixed rack, the connecting rack and the inner fixed rack of the flexible circuit unit of the vibration assembly. When the speaker structure vibrates and produces sound, the flexible circuit unit will be affected by the vibration under the condition of bearing weight, thereby causing deformation of the structure of the flexible circuit unit. By utilizing the different thicknesses of the outer fixed rack, the connecting rack and the inner fixed rack, the structural strength of the flexible circuit unit can be increased, thereby enhancing the durability of the speaker structure and extending the speaker structure's service life.

It should also be noted that the terms "include," "comprise," and any variations thereof are intended to encompass non-exclusive inclusion. This means that a process, method, article, or apparatus that includes a list of elements not only includes those elements but may also include other elements not explicitly listed or inherent elements of the process, method, article, or apparatus. Without further limitation, an element defined by the phrase "including a . . . " does not exclude the presence of additional identical elements in the process, method, article, or apparatus that includes the element.

The above description illustrates and describes several preferred embodiments of the present application. However, it should be understood that the present application is not limited to the forms disclosed herein and should not be seen as excluding other embodiments. It can be applied in various other combinations, modifications, and environments, and modifications can be made within the scope of the inventive concepts as taught or suggested herein or within the relevant field's technical knowledge. Any alterations and changes made by those skilled in the art without departing from the spirit and scope of the present application should fall within the scope of the appended claims.

What is claimed is:

1. A speaker structure, comprising a magnetic conductive carrier plate;

a magnetic assembly, located on the magnetic conductive carrier plate and configured to form a magnetic gap area;

an outer frame, located around a periphery of the magnetic assembly; and a vibration assembly, comprising a flexible circuit unit, a vibrating unit, and a voice coil, the flexible circuit unit comprising an outer fixed rack, a connecting rack, and an inner fixed rack, the connecting rack connecting between the outer fixed rack and the inner fixed rack, wherein a thickness of the outer fixed rack is greater than the thickness of the connecting rack, the thickness of the connecting rack is greater than the thickness of the inner fixed rack, the flexible circuit unit located on the magnetic assembly, the outer fixed rack of the flexible circuit unit disposed on the outer frame, the voice coil disposed on the inner fixed rack of the flexible circuit unit, the voice coil located within the magnetic gap area, the vibrating unit disposed on the flexible circuit unit.

2. The speaker structure as claimed in claim 1, the outer fixed rack comprising an outer substrate, a first outer cladding unit and a second outer cladding unit, the outer substrate disposed on the first outer cladding unit, the second outer cladding unit disposed on the outer substrate.

3. The speaker structure as claimed in claim 2, the outer substrate comprising an outer substrate layer, a first outer conductive layer and a second outer conductive layer, the first outer cladding unit comprising a first outer cladding layer and a first outer adhesive layer, the second outer cladding unit comprising a second outer cladding layer and a second outer adhesive layer, the first outer conductive layer and the second outer conductive layer disposed on two sides of the outer substrate layer respectively, the first outer adhesive layer covering an outer side of the first outer conductive layer, the first outer cladding layer disposed on the outer side of the first outer adhesive layer, the second outer adhesive layer covering the outer side of the second outer conductive layer, the second outer cladding layer disposed on the outer side of the second outer adhesive layer.

4. The speaker structure as claimed in claim 3, the first outer cladding unit further comprising a first auxiliary cladding layer and a first auxiliary adhesive layer, the first auxiliary adhesive layer disposed on the outer side of the first outer cladding layer, the first auxiliary cladding layer disposed on the outer side of the first auxiliary adhesive layer.

5. The speaker structure as claimed in claim 2, further comprising a conducting unit disposed on the outer frame, the flexible circuit unit further comprising an external conductive portion, the external conductive portion extends inward from the outer fixed rack, one end of the conducting unit electrically connected to the external conductive portion, another end of the conducting unit protruding from the outer frame.

6. The speaker structure as claimed in claim 1, the connecting rack comprising a connecting substrate, a first connecting unit and a second connecting unit, the connecting substrate disposed on the first connecting unit, the second connecting unit disposed on the connecting substrate.

7. The speaker structure as claimed in claim 6, the connecting substrate comprising a connecting substrate layer and connecting conductive layer, the first connecting unit comprising a first connecting cladding layer and a first connecting adhesive layer, the second connecting unit comprising a second connecting cladding layer and a second connecting adhesive layer, the connecting conductive layer disposed on one side of the connecting substrate layer, the first connecting adhesive layer covering the outer side of the first connecting conductive layer, the first connecting cladding layer disposed on the outer side of the first connecting adhesive layer, the second connecting adhesive layer disposed on another side of the connecting substrate layer, the second connecting cladding layer disposed on the outer side of the second connecting adhesive layer.

8. The speaker structure as claimed in claim 1, the inner fixed rack comprising an inner substrate and an inner cladding unit, the inner substrate disposed on the inner cladding unit.

9. The speaker structure as claimed in claim 8, the inner substrate comprising an inner substrate and an inner conductive layer, the inner cladding unit comprising an inner cladding layer and an inner adhesive layer, the inner conductive layer disposed on one side of the inner substrate, the inner adhesive layer covering the outer side of the inner conductive layer, the inner cladding layer disposed on the outer side of the inner adhesive layer.

10. The speaker structure as claimed in claim 9, the flexible circuit unit further comprising an internal conductive portion, the internal conductive portion extending inward from the inner fixed rack, the internal conductive portion electrically connected between the inner conductive layer and the voice coil.

11. The speaker structure as claimed in claim 10, the magnetic assembly comprising a main magnet, a subordinate magnet, a main magnetic conductive element and a subordinate magnetic conductive element, the main magnet and the subordinate magnet disposed on the magnetic conductive carrier plate, the subordinate magnet located on the outer side of the main magnet, the magnetic gap area formed between the main magnet and the subordinate magnet, the main magnetic conductive element disposed on the main magnet, the subordinate magnetic conductive element disposed on the subordinate magnet, wherein the main magnetic conductive element has a notch, the notch located on a path of the vertical vibration of the internal conductive portion.

12. The speaker structure as claimed in claim 11, an inner side of the outer frame further comprising a plurality of inner fixed grooves, the subordinate magnetic conductive element has a plurality of outer fixed portions corresponding to the plurality of the inner fixed groove, the plurality of outer fixed portions of the subordinate magnetic conductive element engaged with the plurality of the inner fixed grooves of the outer frame.

13. The speaker structure as claimed in claim 1, the magnetic conductive carrier plate has a fixed protrusion, the outer frame has a recess corresponding to the fixed protrusion, the outer frame disposed on the outer side of the magnetic conductive carrier plate, the fixed protrusion of the magnetic conductive carrier plate engaged with the recess of the outer frame.

14. The speaker structure as claimed in claim 1, further comprising a dust screen, two sides of the outer frame has an openwork portion, the openwork portion has an air vent, the dust screen disposed on the openwork portion, and the dust screen seals the air vent.

15. The speaker structure as claimed in claim 1, the outer fixed rack, the connecting rack and a substrate structure of the inner fixed rack are integrally formed.

16. The speaker structure as claimed in claim 1, there are three connecting racks, one end of each the connecting rack is bent inwardly from the outer fixed rack and connected to the inner fixed rack.

17. The speaker structure as claimed in claim 1, the vibration assembly further comprising a retaining ring, the retaining ring disposed between the flexible circuit unit and the vibrating unit.

18. The speaker structure as claimed in claim 17, the vibrating unit further comprising a vibration membrane portion and a flange ring, the inner side of the flange ring arranged around the periphery of the vibration membrane portion, the outer side of the flange ring disposed on the retaining ring.

19. The speaker structure as claimed in claim 17, the outer frame further comprising a plurality of convex, the retaining ring set around the outer side of the plurality of the convex.

20. The speaker structure as claimed in claim 1, the outer frame further comprising a plurality of fixed grooves, the outer fixed rack of the flexible circuit unit adhered to the plurality of the fixed grooves of the outer frame and a surface of a periphery of the opening of the plurality of the fixed grooves.

* * * * *